US010395427B1

(12) United States Patent
Côté et al.

(10) Patent No.: US 10,395,427 B1
(45) Date of Patent: Aug. 27, 2019

(54) ON-SITE VISUALIZATION AND MODELING USING P AND ID DRAWINGS AND AUGMENTED REALITY

(71) Applicant: Bentley Systems, Incorporated, Exton, PA (US)

(72) Inventors: Stéphane Côté, Lac Beauport (CA); Vincent Hamel, Québec (CA)

(73) Assignee: Bentley Systems, Incorporated, Exton, PA (US)

( * ) Notice: Subject to any disclaimer, the term of this patent is extended or adjusted under 35 U.S.C. 154(b) by 0 days.

(21) Appl. No.: 15/485,207

(22) Filed: Apr. 11, 2017

(51) Int. Cl.

| | |
|---|---|
| ***G06T 19/00*** | (2011.01) |
| ***G06T 7/73*** | (2017.01) |
| ***G06K 9/00*** | (2006.01) |
| ***G06K 9/20*** | (2006.01) |
| ***G06T 19/20*** | (2011.01) |

(52) U.S. Cl.
CPC ........ *G06T 19/006* (2013.01); *G06K 9/00671* (2013.01); *G06K 9/2081* (2013.01); *G06T 7/75* (2017.01); *G06T 19/20* (2013.01); *G06T 2207/20101* (2013.01); *G06T 2207/30244* (2013.01)

(58) Field of Classification Search
CPC ........... G06C 30/0252; G06F 17/30241; G06F 17/30259; G06T 19/003; G06T 19/006; G06Q 30/0252
USPC .......................................................... 345/419
See application file for complete search history.

(56) References Cited

U.S. PATENT DOCUMENTS

| | | | | |
|---|---|---|---|---|
| 9,536,351 | B1 | 1/2017 | Côté | |
| 2010/0257464 | A1 | 10/2010 | Renner | |
| 2013/0155058 | A1* | 6/2013 | Golparvar-Fard | G06T 19/006 345/419 |
| 2016/0027216 | A1* | 1/2016 | da Veiga | G02B 27/0172 345/419 |
| 2016/0049005 | A1* | 2/2016 | Mullins | G06T 19/006 345/420 |
| 2016/0217624 | A1* | 7/2016 | Finn | G01C 15/002 |
| 2017/0256097 | A1* | 9/2017 | Finn | G06T 7/73 |

(Continued)

OTHER PUBLICATIONS

U.S. Appl. No. 15/091,796, filed Apr. 6, 2006 by Stéphane Côté et al. for Tool for Accurate Onsite Model Visualization That Facilitates Environment Interaction, pp. 1-29.

(Continued)

*Primary Examiner* — Kimbinh T Nguyen
(74) *Attorney, Agent, or Firm* — Cesari and McKanna, LLP; James A. Blanchette

(57) ABSTRACT

An augmented reality application is proved that enhances on-site visualization and modeling using functional drawings (e.g., P&IDs). The augmented reality application may utilize a 3-D model as a bridge between symbols and lines in a functional drawing and objects (e.g., pieces of equipment) in the physical environment, to allow a user to rapidly locate a symbol or line in the functional drawing that represents a user-selected object (e.g., piece of equipment) in the physical environment or to rapidly locate an object (e.g., piece of equipment) in the physical environment that is represented by a user-selected symbol or line in the functional drawing. The augmented reality application may further allow a user to efficiently modify (e.g., add elements to) a 3-D model based on changes (e.g., additions) to a functional drawing.

27 Claims, 12 Drawing Sheets

(56) References Cited

U.S. PATENT DOCUMENTS

| | | | | |
|---|---|---|---|---|
| 2018/0075649 | A1* | 3/2018 | Godwin | G06T 17/05 |
| 2018/0131907 | A1* | 5/2018 | Schmirler | H04N 5/23238 |
| 2018/0157455 | A1* | 6/2018 | Troy | G06F 3/147 |

OTHER PUBLICATIONS

U.S. Appl. No. 13/909,690, filed Jun. 4, 2013 by Stéphane Côté et al. for Panoramic Video Augmented Reality, pp. 1-24.

U.S. Appl. No. 13/364,846, filed Feb. 2, 2012 by Stéphane Côté et al. for Technique for Providing an Initial Pose for a 3-D Model, pp. 1-35.

Gibilisco, Stan, "Beginner's Guide to Reading Schematics," TAB, Third Edition, McGraw-Hill Education, New York, 2014, pp. 1-182.

* cited by examiner

ON-SITE VISUALIZATION AND MODELING USING P AND ID DRAWINGS AND AUGMENTED REALITY

BACKGROUND

Technical Field

The present disclosure relates to on-site visualization and modeling using functional drawings, such as piping and instrumentation drawings (P&IDs) and augmented reality.

Background Information

A number of engineering fields utilize functional drawings. In contrast to a three dimensional (3-D) model that is composed of elements disposed at locations in 3-D space and having respective sizes and shapes, a functional drawing is independent of size and shape, focusing instead on process flow. In the field of plant maintenance and design, a common type of functional drawing is a P&ID that shows piping and vessels in a process flow, together with the instrumentation and control devices. A standard set of symbols may be utilized in a P&ID, for example, symbols based on International Society of Automation (ISA) standards.

FIG. 1 is an example P&ID 100 including symbols representing vessels, instrumentation and control devices, and lines representing pipes. Since the P&ID is independent of size and shape, the size and arrangement of symbols and lines do not necessarily bear any relation to the physical properties of vessels, instrumentation, control devices, and pipes. For example, a short line in the P&ID may represent a short pipe in a physical plant, or a very long pipe in the physical plant, since the process flow is unchanged by this physical difference. Likewise, two adjacent valves in the P&ID may be closely located in the physical plant, or widely separated in the physical plant. As a result, there is typically an infinite number of potential physical implementations of a P&ID.

Since are potentially an infinite number of physical implementations, several difficulties are encountered when a worker attempts to use a functional drawing, such as a P&ID, to perform maintenance and design tasks. For example, suppose a worker is in a plant desires to repair a particular piece of malfunctioning equipment (e.g., a pressure instrument on a pipe). While the worker may know the physical location of the malfunctioning equipment, he or she may not know what other equipment is nearby and its relation to the malfunctioning equipment. A functional drawing (e.g., P&ID) may include this information, but to be useful the worker would need to be able to determine which pieces of equipment correspond to which lines or symbols on the functional drawing. Given that there is no direct relationship between the size and arrangement of symbols and lines on the functional drawing and the physical environment, this may be a difficult and time consuming task. In some cases, tagging systems may be used to attempt to address this problem, but it is an imperfect solution. A tagging system may indicate the approximate location of a piece of equipment, but once at the approximate location, a worker generally still needs to inspect (e.g., check device tags on) each nearby piece of equipment to locate the correct one. In a complicated system, this still may be time consuming.

Further, suppose the worker instead knows the symbol on the functional drawing (e.g., P&ID) for a particular piece of equipment (e.g., a pressure instrument) that is malfunctioning, but does not know the physical location of that piece of equipment in the physical environment. Since that there is no direct relationship between the size and arrangement of symbols and lines on the functional drawing and the physical environment, locating the piece of malfunctioning equipment may be a difficult and time consuming task.

Further, on occasion a worker may be tasked with modifying the design of the plant. Suppose a worker desires to add a piece of equipment (e.g., a bypass pipe) to an existing plant. The worker may determine on a functional drawing (e.g., P&ID) how the new equipment should be integrated into the overall process flow. However, adding the new equipment to the functional drawing does not specify where the new equipment should be physically located in the plant. Typically, the worker must determine the physical location of existing equipment (e.g., existing pipes) that interact with the new equipment, and determine a location for the new equipment that works with these existing locations, while not conflicting with other equipment. Again, such tasks can be difficult and time consuming task.

The problem may be magnified on larger jobs that are sent to outside contractors. A plant owner may provide an outside contractor a functional drawing showing new equipment to solicit a bid. In order to prepare the bid, the outsider contractor typically must determine locations for the new equipment based on locations of existing equipment, and therefore typically will travel to the plant and measure it (e.g., manually, via scan or via survey). The outside contractor will then take this information back to their office, produce a 3-D design there, and submit a bid. However, it is common a contractor to discover back at their office that the on-site measurements are not sufficient, and some piece of information has been overlooked. This may require follow-up on-site visits to take additional measurements, adding to time an expense.

Accordingly, there is a need for new techniques for on-site visualization and modeling using functional drawings, such as P&IDs.

SUMMARY

An augmented reality application is provided that enhances on-site visualization and modeling using functional drawings (e.g., P&IDs). The augmented reality application may utilize a 3-D model as a bridge between symbols and lines in a functional drawing and objects (e.g., pieces of equipment) in the physical environment, to allow a user to rapidly locate a symbol or line in the functional drawing that represents a user-selected object (e.g., piece of equipment) in the physical environment or to rapidly locate an object (e.g., piece of equipment) in the physical environment that is represented by a user-selected symbol or line in the functional drawing. The augmented reality application may further allow a user to efficiently modify (e.g., add elements to) a 3-D model based on changes (e.g., additions) to a functional drawing.

In one embodiment, an augmented reality application executing on an electronic device (e.g., a head-mounted display unit, tablet computer, etc.) provides an on-site method for locating a symbol or line in a functional drawing (e.g., P&ID) that represents a user-selected object (e.g., a piece of equipment) in the physical environment. The augmented reality application accesses at least a portion of a 3-D model and the functional drawing for the location of the electronic device, from a memory of the electronic device or a remote server. The augmented reality application then aligns the 3-D model with the scene, augments the scene based on the aligned 3-D model, and displays the augmented scene on a display of the electronic device. Subsequently, the user selects an object (e.g., piece of equipment) in the displayed augmented scene. The augmented reality application determines a 3-D element of the 3-D model that corresponds to the user-selected object, and therefrom determining a corresponding line or symbol of the functional drawing. The augmented reality application then displays a version of the functional drawing in which the corresponding line or symbol is highlighted on the display of the electronic device.

In another embodiment, an augmented reality application executing on an electronic device (e.g., a head-mounted display unit, tablet computer, etc.) provides an on-site method for locating an object (e.g., a piece of equipment) in the physical environment that is represented by a user-selected symbol or line in a functional drawing (e.g., P&ID). The augmented reality application accesses a functional drawing for the location of the electronic device, from a memory of the electronic device or a remote server. Each line or symbol of the functional drawing corresponds to an element of a 3-D model. The augmented reality application displays the functional drawing on a display of the electronic device, and a user selects a line or symbol in the functional drawing. The augmented reality application determines a 3-D element of the 3-D model that corresponds to the user-selected line or symbol. The augmented reality application then accesses at least a portion of the 3-D model for a location of the electronic device from the memory of the electronic device or the remote server, aligns the 3-D model with the scene, augments the scene based on the aligned 3-D model, generates a path in the augmented scene to an object corresponding to the 3-D element or highlights in the augmented scene the object corresponding to the 3-D element, and displays the augmented scene including the path or highlighting on a display of the electronic device.

In still another embodiment, an augmented reality application executing on an electronic device (e.g., a head-mounted display unit, tablet computer, etc.) provides an on-site method for modifying a 3-D model of the physical environment based on changes to a functional drawing (e.g., P&ID). The augmented reality application accesses at least a portion of a 3-D model and a functional drawing for the location of the electronic device from a memory of the electronic device or a remote server. The functional drawing includes a plurality of lines and symbols that each correspond to an element in the 3-D model. The augmented reality application then aligns the 3-D model with the scene, augments the scene based on the aligned 3-D model, and displays the augmented scene on a display of the electronic device. Subsequently, a user selects one or more lines or symbols in the functional drawing and selects a modification (e.g., an addition) to be made to the process flow involving the one or more user-selected lines or symbols. In response, the augmented reality application adds a 3-D element to the 3-D model corresponding to the modification (e.g., addition) in the functional drawing. The 3-D element may be coupled to 3-D elements representing the one or more user-selected lines or symbols. The augmented reality application then displays the added 3-D element in the augmented scene on a display of the electronic device. The user may change the location and orientation of the 3-D element in the augmented scene. Further, the user may add additional 3-D elements to the augmented scene. When complete, the augmented reality application saves an updated version of the 3-D model including the added 3-D element(s) to the memory of the electronic device or the remote server.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings of example embodiments, of which.

DETAILED DESCRIPTION

Figure 1:
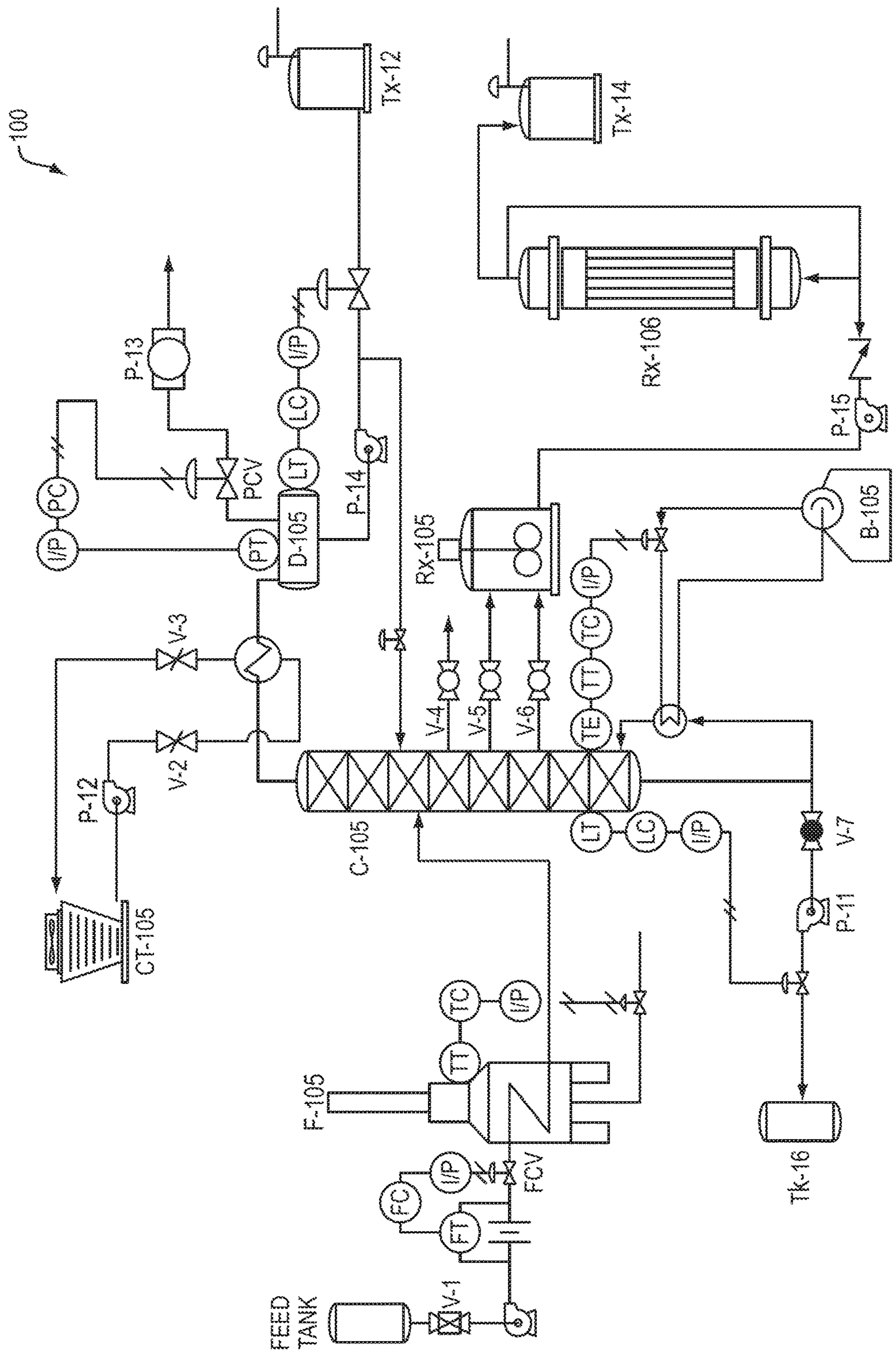
FIG. 1 is an example P&ID including symbols representing vessels, instrumentation and control devices, and lines representing pipes.
Figure 2:
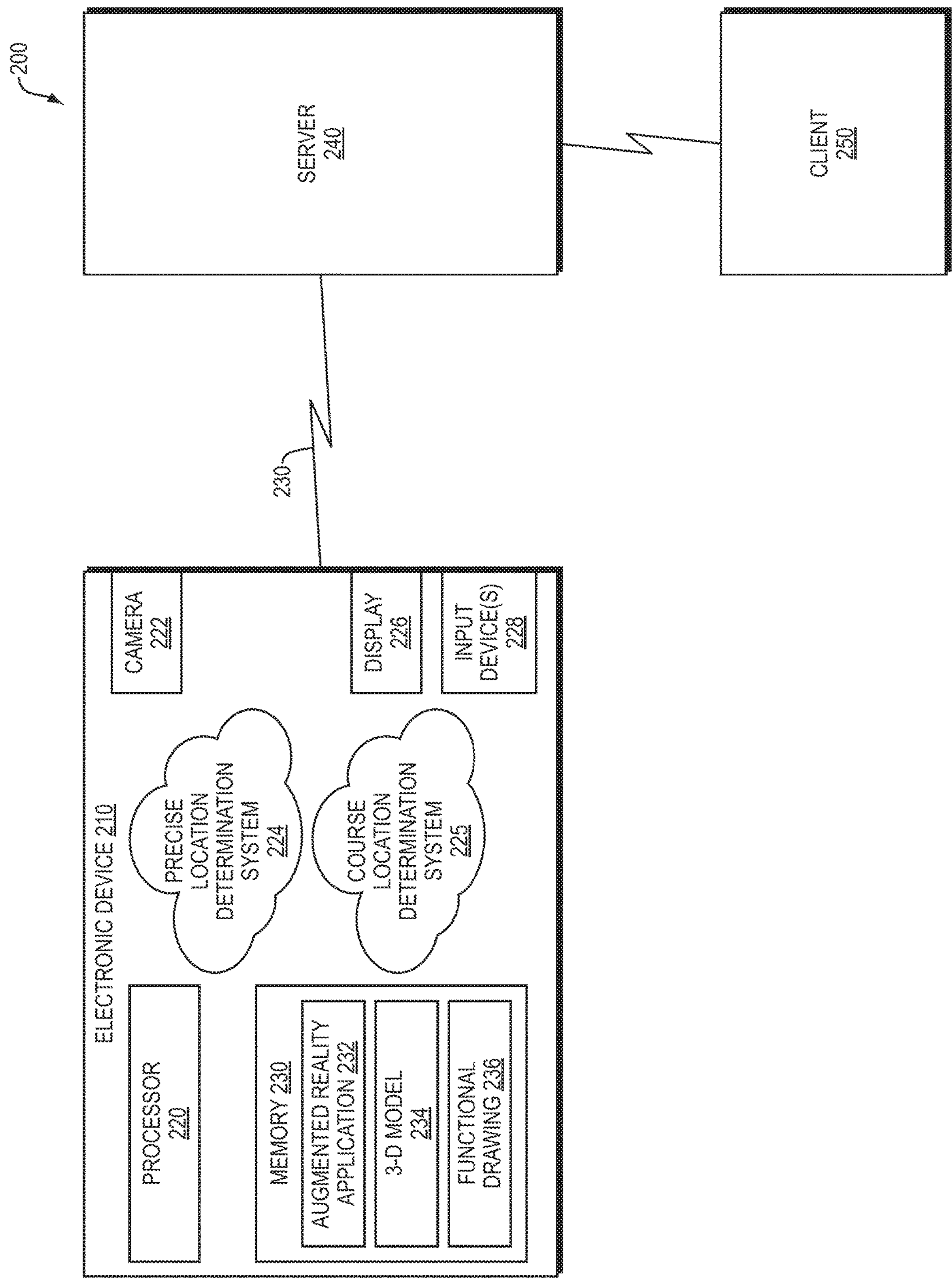
FIG. 2 is a block diagram of an example system for on-site visualization and modeling using functional drawings and augmented reality.

FIG. 2 is a block diagram of an example system 200 for on-site visualization and modeling using functional drawings and augmented reality. The system include an electronic device 210, which communicates with a remote server 240. Further a client device 250 may communicate with the server 240 and be used to conduct certain pre-configuration tasks.

The electronic device 210 may be a head-mounted display unit (such as the Microsoft HoloLens® head-mounted display unit), a tablet computer, or another type of mobile computing device that may be transported to a site (e.g., a plant). The electronic device 210 includes a processor 220 coupled to volatile and non-volatile memory devices 230 that, among other things, store processor-executable instructions and data. The instructions include instructions of an augmented reality application 232. The data includes a copy of a least a portion of a 3-D model for the site (e.g., the plant) and a functional drawing (e.g., P&ID) related to the site. In some implementations, the electronic device 210 may include a camera 220 (e.g., a video camera) configured to capture a stream of images of the physical environment. Further, the electronic device 210 includes a coarse location determination system 224 (e.g., a Wi-Fi positioning system client, global positioning system (GPS) client, a tag-based position system, etc.) comprising hardware and/or software configured to determine an approximate (i.e. a low-precision) location of the electronic device 210, and a precise position determination system 225 comprising hardware and/or software configured to determine a pose (i.e. a precise location and orientation) of the electronic device 210. In some implementations the camera 222 may be part of the precise position determination system 225 and the stream of images therefrom matched against the 3-D model to determine pose. In other implementations, another type of tracking system, such as an outside tracking system separate from the electronic device 210 (not shown) may be used to determine the pose. In addition, the electronic device 210 further includes a display (e.g., a stereoscopic optical see-through head-mounted display, a touch screen panel, etc.) configured to show an augmented reality view, including overlays of the functional drawing (e.g., P&ID), and at least one input device (e.g., a thumb-sized finger-operated "Clicker", a touch sensor, a sensor detecting hand gestures, a voice command interface, etc.) configured to receive user selections in the augmented reality view and/or functional drawing. It should be understood that that electronic device 210 may include a wide variety of other hardware and software components, and that the above described components are merely illustrative.

While the 3-D model 234 and the functional drawing 236 may be pre-loaded locally in the memory 230 of the electronic device 210, in other implementation's the electronic device 210 may obtain the 3-D model 234 and the functional drawing 236 upon demand via a network connection 230 to the remote server 240. The remote server 240 maintains a repository of 3-D models and functional drawings that are available upon demand. The 3-D models may be originally created by a modeling application executing on one or more separate client devices 250 in communication with the remote server 240, based on information embodied in manual measurements, point clouds, meshes, or other types of data capture performed at the site (e.g., plant). To enable the below described techniques, during initial construction of the 3-D model 234, or as a subsequent pre-configuration step, the modeling application defines correspondence may between each element of the 3-D model 234 and a line or symbol of the functional drawing 236 (e.g., via use of a common identifier, pointer, etc.).

Figure 3:
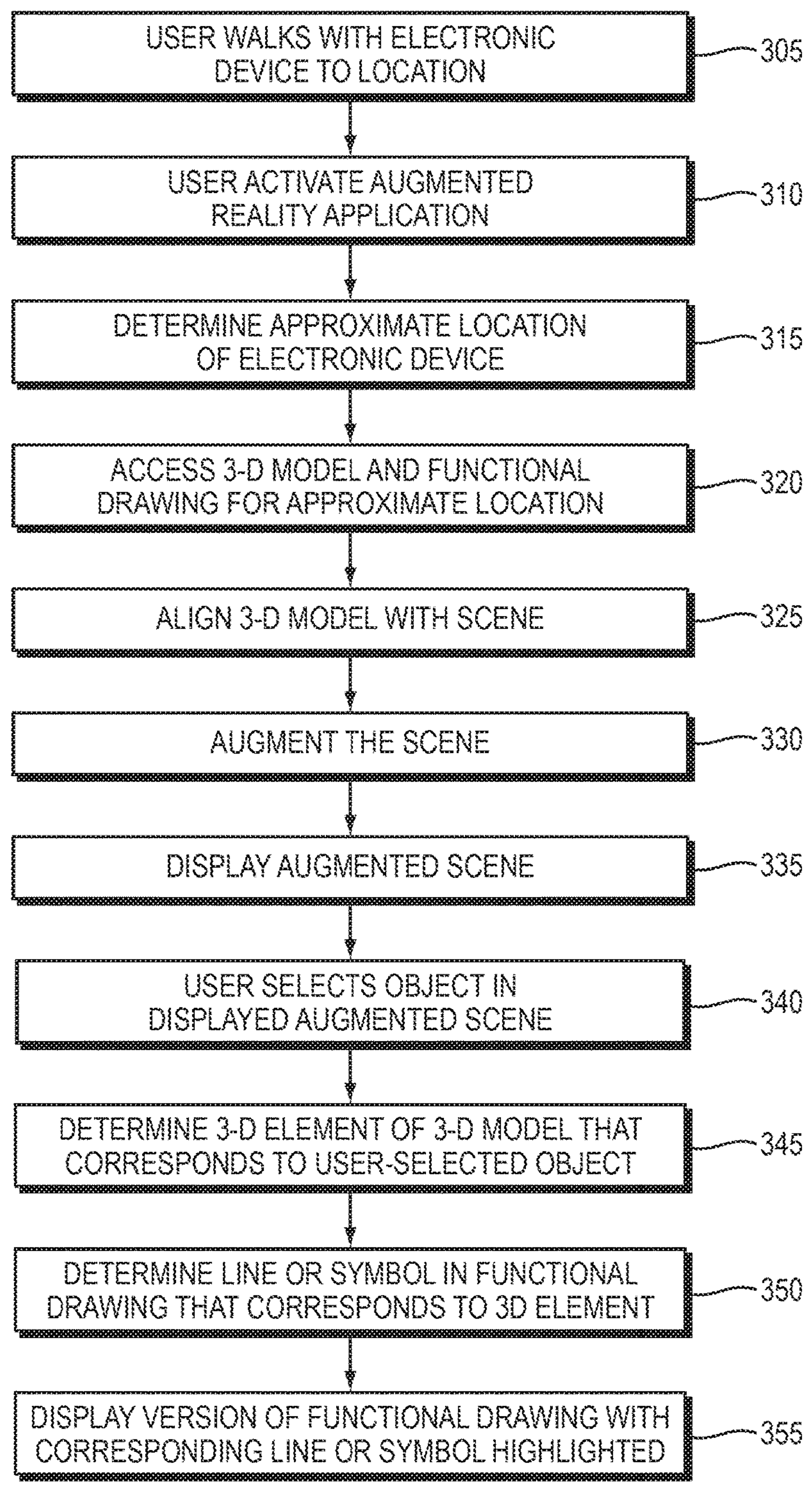
FIG. 3 is a flow diagram of an example sequence of steps that may be executed using the system of FIG. 2 to locate a symbol or line in the functional drawing (e.g., P&ID) that represents a user-selected object (e.g., a piece of equipment) in the physical environment.
Figure 4A:
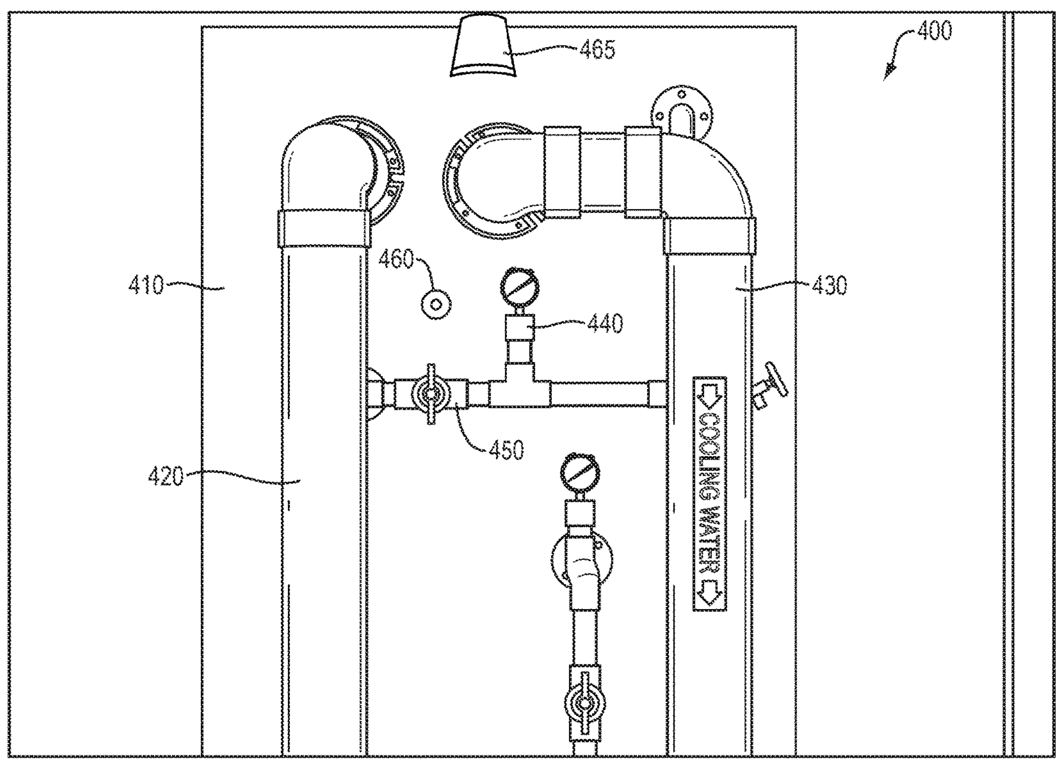
FIG. 4A is an example augmented scene that may be shown on the display of an electronic device.

FIG. 3 is a flow diagram of an example sequence of steps that may be executed using the system of FIG. 2 to locate a symbol or line in the functional drawing (e.g., P&ID) 236 that represents a user-selected object (e.g., a piece of equipment) in the physical environment. At step 305, the user walks with the electronic device 210 to the location in the physical environment where the object of interest is located. In an illustrative example referred to below, the object of interest may be a heat exchanger in a piping system. The user may be prompted to walk to the location, for example, by an alarm. At step 310, the user activates the augmented reality application 232 on the electronic device 210. At step 315, the augmented reality application 232 uses the coarse location determination system 224 to determine an approximate location of the electronic device 210. At step 320, the augmented reality application 232 access a 3-D model (or, a portion of a 3-D model) 234 and a functional drawing 236 that includes information for the approximate location. The 3-D model 234 and functional drawing 236 may already be resident in the memory 230 of the electronic device 210, or may be downloaded from the remote server 240. At step 325, the augmented reality application 232 aligns the 3-D model with the scene. The operation may involve determining a pose (i.e. a precise orientation and a precise location) of the electronic device 210. Pose may be determined based on a number of different techniques, In one implementation, the augmented reality application 232 activates the camera 222 of the electronic device 210 so that it captures a stream of images of a scene in the physical environment, and these images are matched against the 3-D model 234. In another implementation, an outside tracking system is used to determine the pose. At step 330, the augmented reality application 232 starts augmenting the scene. The augmentation may take a number of different forms. In one implementation, graphics based on the 3-D model may be overlaid on the scene. At step 335, the augmented reality application 232 displays the augmented scene on the display 226 of the electronic device 210. Such display, depending on the implementation, may involve a direct view with the graphics overlaid or images of the scene captured by the camera 222 with the graphics overlaid. FIG. 4A is an example augmented scene 400 that may be shown on the display 226 of an electronic device 210. The augmented scene 400 shows the physical environment, including the object of interest, in this example, the heat exchanger 410 (located behind a panel), and other objects, in this example, pipes 420, 430 leading to and from the heat exchanger 410, a pressure instrument 440, a pressure instrument shut off valve 450, as well as other components of the piping system. The augmented scene 400 also shows overlaid graphics, in this example, graphics 465 based on an alarm.

Figure 4B:
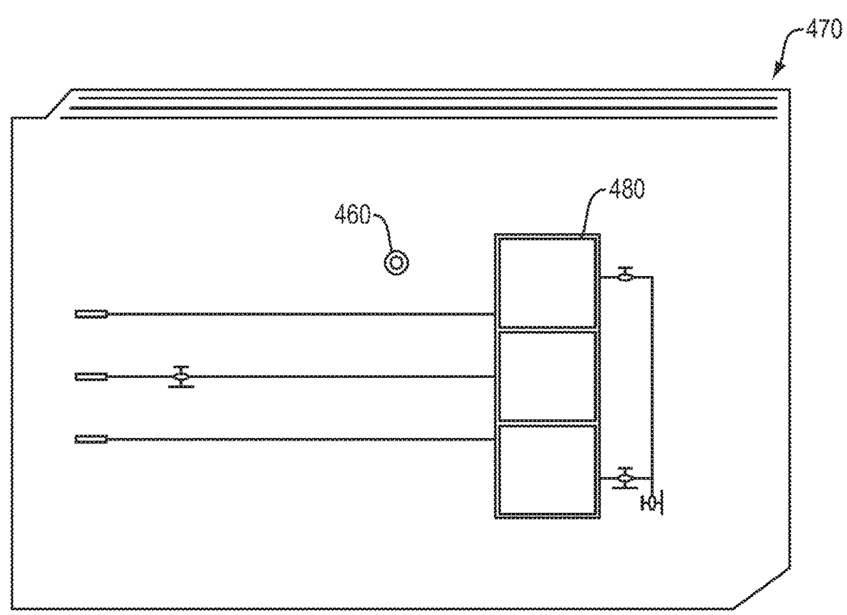
FIG. 4B is an example functional drawing (e.g., P&ID) including highlighting that may be shown on the display of the electronic device.

At step 340, the user selects the object of interest in the displayed augmented scene using an input device 228. In some implementations, the augmented reality application 232 may highlight the selected object in the augmented scene for confirmation to the user that he or she indeed selected the correct object. Referring to FIG. 4A, the selection may be made by moving a cursor 460 over the object, in this example over the heat exchanger 410 (or, more specifically, over the panel covering the heat exchanger), and using the input device 228 to make a selection (e.g., "clicking" on it). At step 345, the augmented reality application 232 determines the 3-D element of the 3-D model 234 that corresponds to the user-selected object based on alignment. At step 350, the augmented reality application 232 determines the line or symbol of the functional drawing 236 that corresponds to the 3-D element based upon preconfigured correspondences. Then, at step 355, the augmented reality application 232 displays on the display 226 of the electronic device 210 a version of the functional drawing in which the corresponding line or symbol is highlighted. The highlighting may take a number of different forms, including a change to color, texture, intensity or other visual quality on or about the line or symbol that distinguishes it from the rest of the functional drawing. FIG. 4B is an example functional drawing (e.g., P&ID) 470 including highlighting that may be shown on the display 226 of the electronic device 210. The line or symbol corresponding to the object of interest, in this example the symbol 480 corresponding to the heat exchanger 410, is shown highlighted. By repeating step 340-355 for different selected objects, a user may rapidly discern which objects in the physical world correspond to which lines or symbols on the functional drawing.

Figure 5:
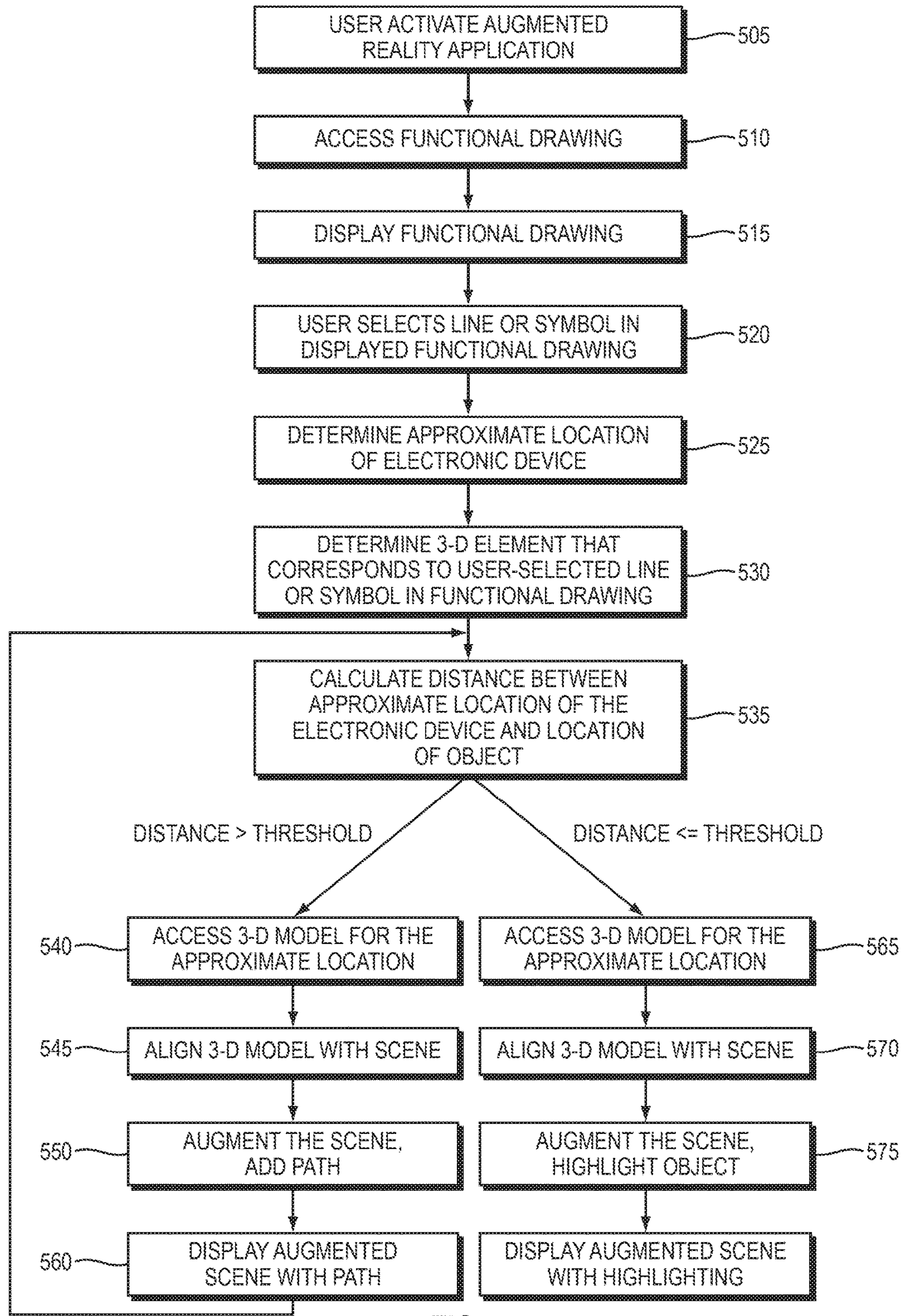
FIG. 5 is a flow diagram of an example sequence of steps that may be executed using the system of FIG. 2 to locate an object (e.g., a piece of equipment) in the physical environment that is represented by a user-selected symbol or line in a functional drawing (e.g., P&ID)
Figure 6A:
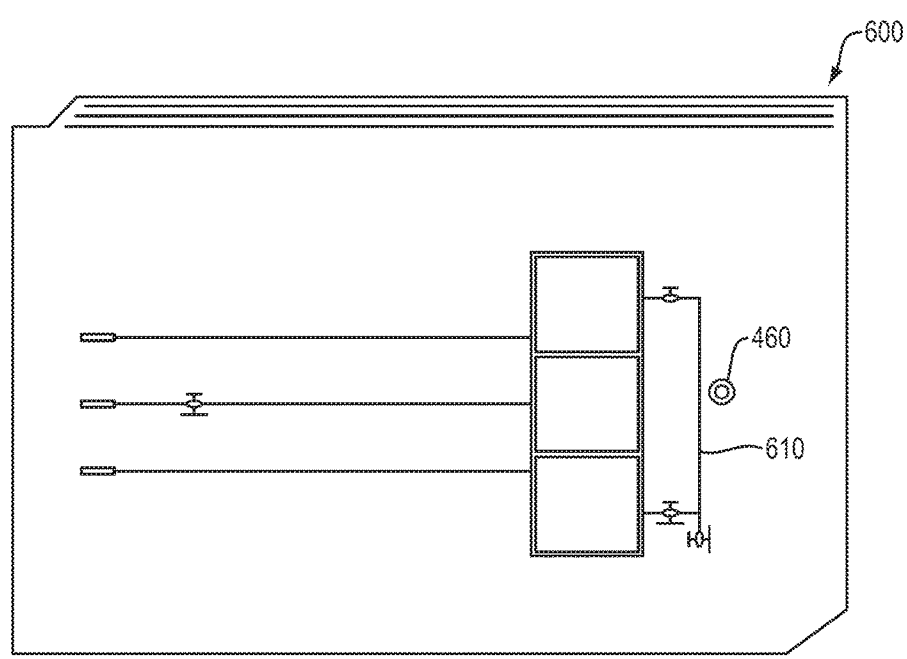
FIG. 6A is an example functional drawing (e.g., P&ID) that may be shown on the display of the electronic device.

FIG. 5 is a flow diagram of an example sequence of steps that may be executed using the system of FIG. 2 to locate an object (e.g., a piece of equipment) in the physical environment that is represented by a user-selected symbol or line in a functional drawing (e.g., P&ID) 236. At step 505, the user activates the augmented reality application 232 on the electronic device 210. At step 510, in response to user input on an input device 228, the augmented reality application 232 access a functional drawing from memory 230 of the electronic device 210, or via a download from remote server 240. At step 515 augmented reality application 232 displays the functional drawing on the display 226 of the electronic device 210. FIG. 6A is an example functional drawing (e.g., P&ID) 610 that may be shown on the display 226 of the electronic device 210.

At step 520, the user selects a line or symbol in the displayed functional drawing using an input device 228. Referring to FIG. 6A, the selection may be made by moving a cursor 460 over a line or symbol, in this example, the symbol for a pressure instrument 510, using the input device 228, and making a selection (e.g., "clicking" on it). At step 525, the augmented reality application 232 uses the coarse location determination system 224 to determine an approximate location of the electronic device 210. At step 530, the augmented reality application 232 determines a 3-D element of a 3-D model 234 that corresponds to the user-selected line or symbol based upon preconfigured correspondences. The 3-D element in turn corresponds to an object in the physical environment based upon preconfigured correspondences. At step 535, a distance is calculated between the approximate location of the electronic device 210 and the location of the object. If the distance exceeds a threshold, execution proceeds to steps 540-560 where the augmented reality application 232 generates a path in an augmented scene to guide the user to the object in the physical environment corresponding to the 3-D element. If the distance does not exceed the threshold, execution proceeds to steps 565-585 where the augmented reality application 232 highlights the object in the augmented scene.

Specifically, at step 540, the augmented reality application 232 access the 3-D model (or, a portion of the 3-D model) 234 that includes information for the approximate location. At step 545, the augmented reality application 232 the augmented reality application 232 aligns the 3-D model with the scene. The operation may involve determining a pose (i.e. a precise orientation and a precise location) of the electronic device 210. Pose may be determined based on a stream of images of a scene in the physical environment captured by the camera 222, an outside tracking system, etc. At step 550 the augmented reality application 232 augments the scene based on the aligned the 3-D model 234, generating a path directing the user towards the object. The path may take any of a number of visual forms. In one implementation, the path may be an arrow overlaid upon the scene. The augmentation may take a number of different forms. In one implementation, the 3-D model may be overlaid over a direct view of the scene visible in an optical see-through. In other implementations, the 3-D model may be overlaid on a stream of images of the scene captured by the camera 222. At step 560, the augmented reality application 232 displays the augmented scene with the path on the display 226 of the electronic device 210. Such display, depending on the implementation, may involve a combination of computer-generated features and a direct view of the scene or images of the scene captured by the camera 222. Steps 540-560 may be repeated until the user has moved the electronic device 210 sufficiently close to the object to satisfy the threshold distance. Execution may then proceed to step 565.

Figure 6B:
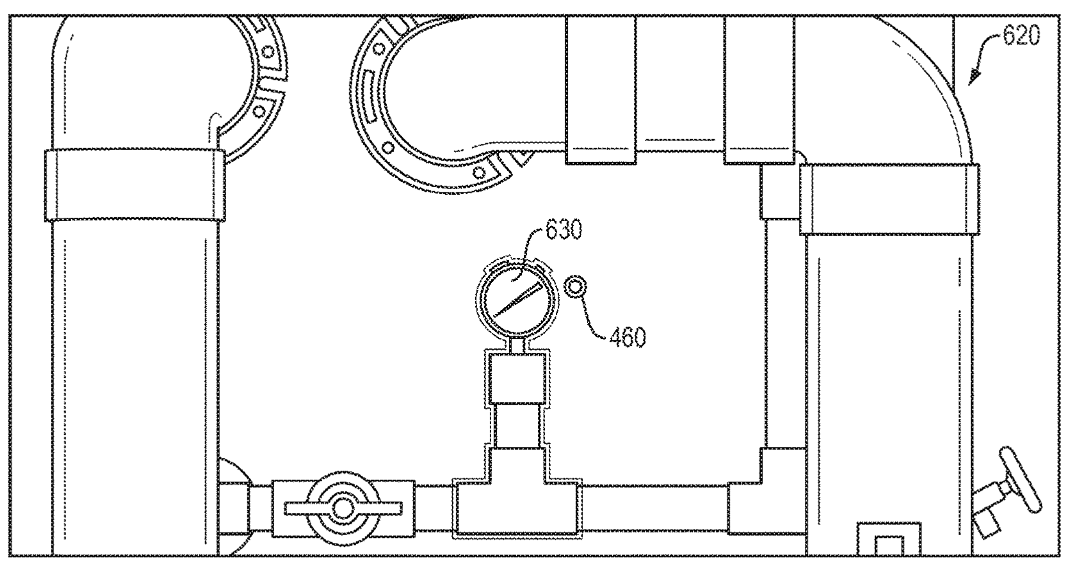
FIG. 6B is an example augmented scene including highlighting that may be shown on the display of the electronic device.

At step 565, the augmented reality application 232 access the 3-D model (or, a portion of the 3-D model) 234 that includes information for the approximate location. At step 570, the augmented reality application 232 aligns the 3-D model with the scene. At step 575, the augmented reality application 232 augments the scene based on the aligned 3-D model, highlighting the object in the physical environment that is represented by the user-selected symbol or line in the functional drawing. The highlighting may take a number of different forms, including a change to color, texture, intensity or other visual quality on or about the object that distinguishes it from the rest of the augmented scene. At step 585, the augmented reality application 232 displays the augmented scene with the highlighted object on the display 226 of the electronic device 210. FIG. 6B is an example augmented scene 620 including highlighting that may be shown on the display 226 of the electronic device 210. In this example the pressure valve 630 is shown highlighted. Steps 565-585 may be repeated as long as the user is within the threshold distance (e.g., as the user potentially moves about to view the object from different perspectives).

Figure 7:
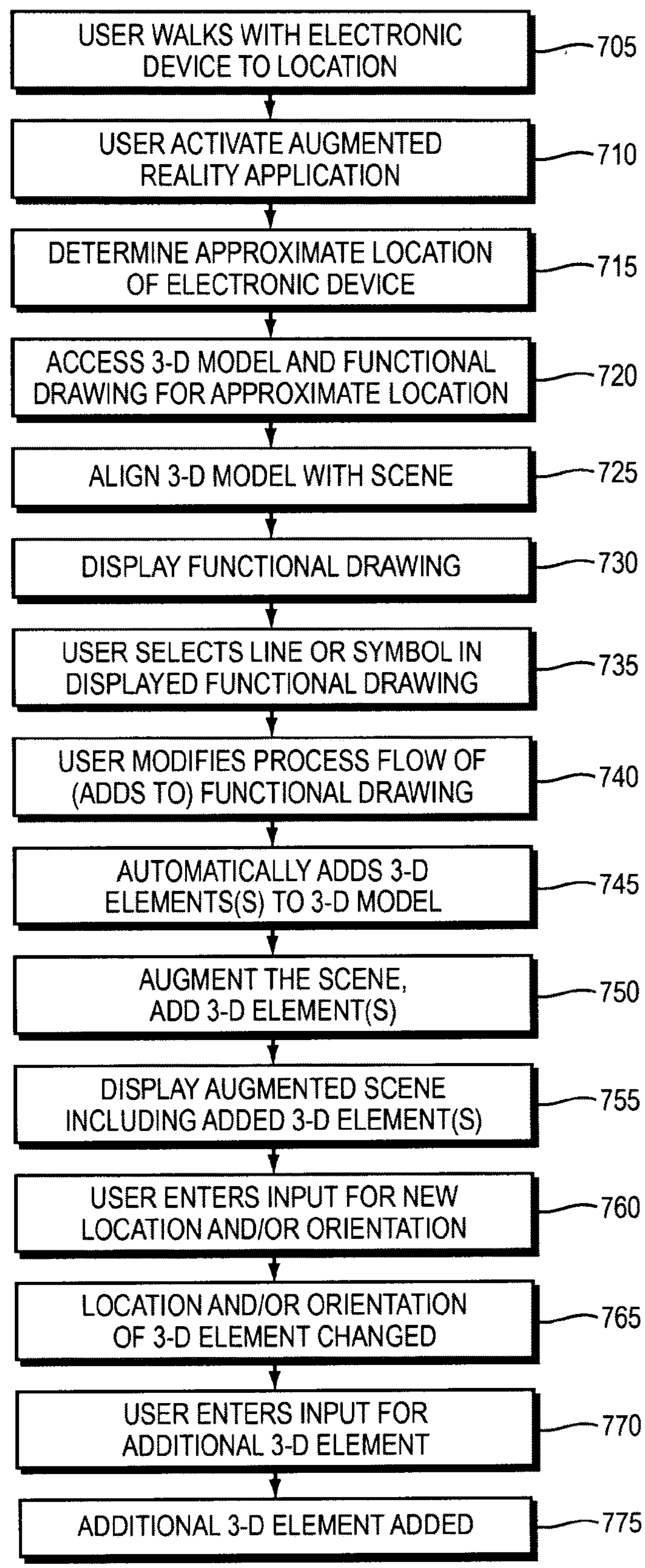
FIG. 7 is a flow diagram of an example sequence of steps that may be executed using the system of FIG. 2 to modifying a 3-D model of the physical environment based on changes to a functional drawing (e.g., P&ID) using augmented reality.

FIG. 7 is a flow diagram of an example sequence of steps that may be executed using the system of FIG. 2 to modifying a 3-D model 234 of the physical environment based on changes to a functional drawing (e.g., P&ID) 236 using augmented reality. At step 705, the user walks with the electronic device 210 to the location in the physical environment where a new object (e.g., a piece of equipment) is be added. In an illustrative example referred to below, the new object is a bypass pipe. At step 710, the user activates the augmented reality application 232 on the electronic device 210. At step 715, the augmented reality application 232 uses the coarse location determination system 224 to determine an approximate location of the electronic device 210. At step 720, the augmented reality application 232 access a 3-D model (or, a portion of a 3-D model) 234 and a functional drawing 236 that includes information for the approximate location. The 3-D model 234 and functional drawing 236 may already be resident in the memory 230 of the electronic device 210, or may be downloaded from remote server 240. At step 725, the augmented reality application 232 aligns the 3-D model with the scene. The operation may involve determining a pose (i.e. a precise orientation and a precise location) of the electronic device 210 based on a stream of images of a scene in the physical environment captured by the camera, an outside tracking system, etc.

Figure 8A:
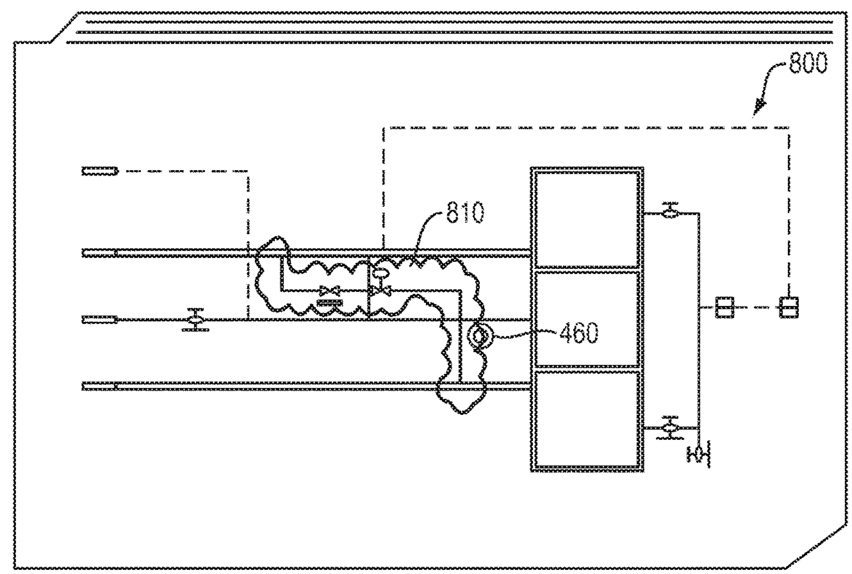
FIG. 8A is an example functional drawing including added symbols that may be shown on the display of the electronic device.

At step 730, the augmented reality application 232 displays the functional drawing (P&ID) on the display 226 of the electronic device 210. At step 735, the user selects one or more line or symbol in the displayed functional drawing using an input device 228. The selection may be made by moving a cursor over a line or symbol and making a selection (e.g., "clicking" on it). At step 740, the user makes a modification to the process flow of the functional drawing involving the one or more user-selected lines or symbols using an input device 228. FIG. 8A is an example functional drawing 800 including added symbols 810 that may be shown on the display 226 of the electronic device 210. In this example, the added symbols represent a bypass (composed of a pipe, instruments, etc.) between the line representing pipes leading to and from a heat exchanger.

Figure 8B:
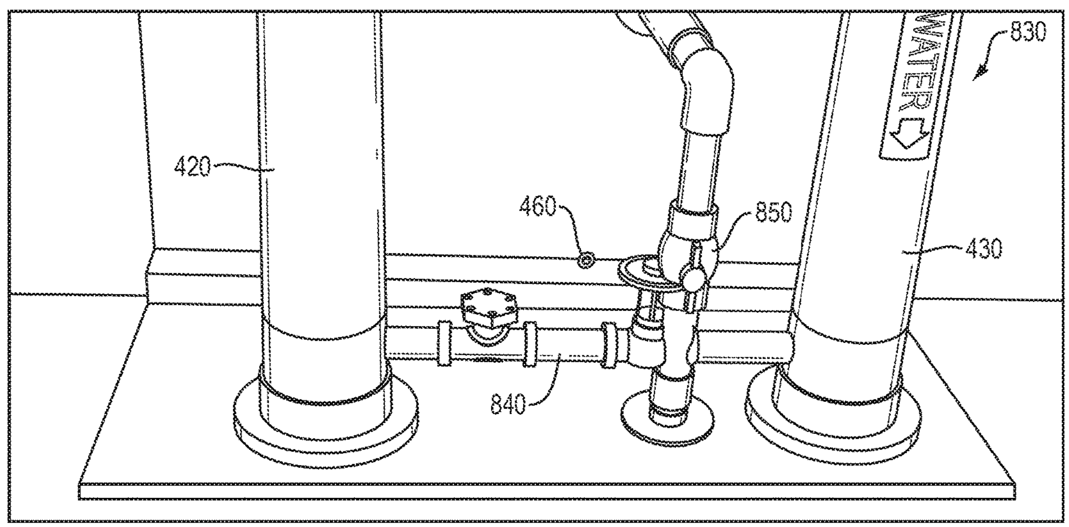
FIG. 8B is an example augmented scene including added 3-D elements that may be shown on the display of the electronic device.

At step 745, the augmented reality application 232 automatically adds one or more 3-D elements (e.g., elements for the new bypass) to the 3-D model 234 corresponding to the modification to the functional drawing 236. The added 3-D element(s) are automatically coupled to 3-D elements corresponding to the one or more user-selected lines or symbols, but may otherwise have an arbitrary location. At least some properties of the added 3-D element(s) (e.g., type, size, material, etc.) may be automatically configured based on (e.g., matched to) properties of the 3-D elements they are coupled to. Alternatively, the user may select properties from a catalog or menu. At step 750, the augmented reality application 232 augments the scene adding graphics for the one or more 3-D elements. The augmentation may take a number of different forms. At step 755, the augmented reality application 232 displays the augmented scene including the added 3-D element(s) on the display 226 of the electronic device 210. Such display, depending on the implementation, may involve a combination of computer-generated features and a direct view of the scene or images of the scene captured by the camera 222. FIG. 8B is an example augmented scene 830 including added 3-D elements that may be shown on the display 226 of the electronic device 210. In this example, 3-D elements representing a bypass 840 are disposed between pipes 420, 430 leading to and from the heat exchanger 410, but at an arbitrary location which happens to conflict with (e.g., intersect) an existing pipe 850.

Figure 8C:
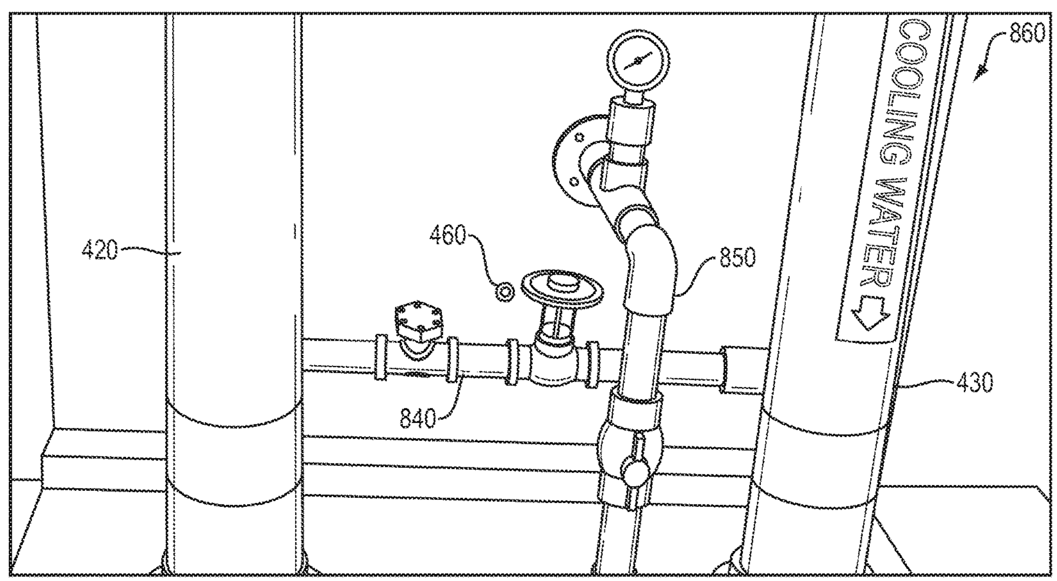
FIG. 8C is an example augmented scene including added 3-D elements adjusted to a new location that may be shown on the display.

At step 760, the user enters input to move (e.g., drags) the added 3-D element(s) in the displayed augmented scene to a new location and/or orientation. At step 765, in response to the user-input, the augmented reality application 232 changes the location and/or orientation of the added 3-D element(s) in the 3-D model, and updates the augmented scene. FIG. 8C is an example augmented scene 830 including added 3-D elements adjusted to a new location that may be shown on the display 226. In this example, the 3-D elements representing a bypass 840 are shown moved to a location that does not conflict with existing pipes. In some implementations, the augmented reality application 232 may propose locations or orientations to the user based on preconfigured design criteria (e.g., to minimized materials).

At step 770, the user enters input in the displayed augmented scene indicating one or more additional 3-D elements used with the added 3-D element(s). The augmented reality application 232 may propose the additional 3-D elements based on the type of the added 3-D element and preconfigured design requirements. For instance, in the example where the added 3-D element(s) represent a bypass, the augmented reality application 232 may propose elbows or other connectors that would enable more complex arrangements of the bypass, pipe supports necessary to support the bypass, of other elements. At step 775, in response to the user-input, the augmented reality application 232 adds the one or more additional 3-D elements to the 3-D model, and updates the augmented scene.

Steps 745-775 may be repeated to add additional 3-D elements to the 3-D model 234. Once this is complete, the augmented reality application 232 saves the updated version of the 3-D model including the added 3-D element(s) to memory 230 of the electronic device 210 or the remote server 240.

In conclusion, while the above description discusses example techniques for on-site visualization and modeling using functional drawings (e.g., P&IDs) and augmented reality, it should be understood that a number of modifications and/or additions may be made without departing from the disclosure's intended spirit and scope. In general, it should be understood that many of the above discussed techniques may be implemented in software, in hardware, or in a combination thereof. A software implementation may include electronic device-executable instructions stored in a non-transitory electronic device-readable medium, such as a volatile or persistent memory, a hard-disk, a compact disk (CD), or other storage medium. A hardware implementation may include specially configured processors, application specific integrated circuits (ASICs), and/or other types of hardware components. Further, a combined software/hardware implementation may include both electronic device-executable instructions stored in a non-transitory electronic device-readable medium, as well as one or more specially configured hardware components. Above all, it should be understood that the above descriptions are meant to be taken only by way of example.

What is claimed is:

1. An on-site method for locating a line or symbol in a functional drawing that represents a user-selected object in a physical environment using augmented reality, comprising:

accessing, from a memory of an electronic device or a remote server, at least a portion of a three-dimensional (3-D) model and the functional drawing for a location of the electronic device, the functional drawing illustrating a process flow using lines and symbols that are independent of size and shape of objects in the physical environment;

aligning the 3-D model with a scene in the physical environment;

augmenting the scene based on the 3-D model;

displaying the augmented scene on a display of the electronic device;

receiving a user-selection of an object in the physical environment in the displayed augmented scene;

determining a 3-D element of the 3-D model that corresponds to the user-selected object;

determining a corresponding line or symbol of the functional drawing that corresponds to the 3-D element; and displaying, on the display of the electronic device, a version of the functional drawing in which the corresponding line or symbol is highlighted.

2. The method of claim 1, wherein the functional drawing is a piping and instrumentation drawing (P&ID), and the version of the functional drawing is a version of the P&ID in which the corresponding line or symbol is highlighted.

3. The method of claim 1, further comprising:

determining, by a coarse location determination system, an approximate location of the electronic device, and wherein the 3-D model and functional drawing are accessed based on the approximate location of the electronic device.

4. The method of claim 1, wherein the aligning the 3-D model further comprises:

capturing, by a camera of the electronic device, a stream of images of the scene; and matching the stream of images of the scene to the 3-D model to determine a pose of the electronic device, the pose of the electronic device including an orientation and a precise location of the electronic device, wherein the augmenting the scene is based on the pose of the electronic device.

5. The method of claim 4, wherein the augmenting the scene augments the stream of images of the scene from the camera.

6. The method of claim 1, wherein at least the aligning the 3-D model, the augmenting the scene, the displaying the augmented scene, the receiving the user-selection, the determining the 3-D element, the determining the corresponding line or symbol, and the displaying the version of the functional drawing are performed by an augmented reality application executing on the electronic device.

7. The method of claim 1, wherein the electronic device is a head-mounted display unit.

8. An on-site method for locating an object in a physical environment that is represented by a user-selected line or symbol in a functional drawing using augmented reality, comprising:

accessing, from a memory of an electronic device or a remote server, a functional drawing including a plurality of lines and symbols that are independent of size and shape of objects in the physical environment, each line or symbol of the functional drawing corresponding to an element of a three-dimensional (3-D) model;

displaying, on a display of the electronic device, the functional drawing;

receiving a user-selection of a line or symbol in the functional drawing;

determining a 3-D element of the 3-D model that corresponds to the user-selected line or symbol;

accessing, from the memory of the electronic device or the remote server, at least a portion of the 3-D model for a location of the electronic device;

aligning the 3-D model with a scene in the physical environment;

augmenting the scene based on the 3-D model, the augmenting including generating a path to an object in the physical environment corresponding to the 3-D element or highlighting the object in the physical environment corresponding to the 3-D element; and displaying the augmented scene including the path or highlighting on the display of the electronic device.

9. The method of claim 8, wherein the functional drawing is a piping and instrumentation drawing (P&ID).

10. The method of claim 8, further comprising:

determining whether a distance between a location of the electronic device and the object in the physical environment exceeds a threshold;

if so, generating the path in the augmented scene to the object in the physical environment corresponding to the 3-D element; and if not, highlighting in the augmented scene the object in the physical environment corresponding to the 3-D element.

11. The method of claim 8, further comprising:

determining, by a coarse location determination system, an approximate location of the electronic device, and wherein the 3-D model and functional drawing are accessed based on the approximate location of the electronic device.

12. The method of claim 8, wherein the aligning the 3-D model further comprises:

capturing, by a camera of the electronic device, a stream of images of the scene;

matching the stream of images of the scene to the 3-D model to determine a pose of the electronic device, the pose of the electronic device including an orientation and a precise location of the electronic device, wherein the augmenting the scene is based on the pose of the electronic device.

13. The method of claim 8, wherein at least the displaying the functional drawing, the receiving the user-selection, the determining the 3-D element, the aligning the 3-D model, the augmenting the scene and the displaying the augmented scene are performed by an augmented reality application executing on the electronic device.

14. The method of claim 8, wherein the electronic device is a head-mounted display unit.

15. An on-site method for modifying a 3-D model of a physical environment based on changes to a functional drawing using augmented reality, comprising:

accessing, from a memory of an electronic device or a remote server, at least a portion of a three-dimensional (3-D) model and the functional drawing for a location of the electronic device, the functional drawing including a plurality of lines and symbols that are independent of size and shape of objects in the physical environment, each line or symbol of the functional drawing corresponding to an element in the 3-D model;

aligning the 3-D model with a scene in the physical environment;

displaying, on a display of the electronic device, the functional drawing;

receiving a user-selection of one or more lines or symbols in the functional drawing;

receiving a user-selection of a modification to a process flow of the functional drawing involving the one or more user-selected lines or symbols;

adding a 3-D element to the 3-D model corresponding to the modification, the 3-D element coupled to 3-D elements representing the one or more user-selected lines or symbols;

augmenting the scene to show the added 3-D element;

displaying the added 3-D element in the augmented scene on the display of the electronic device; and saving an updated version of the 3-D model including the added 3-D element to the memory of the electronic device or the remote server.

16. The method of claim 15, wherein the functional drawing is a piping and instrumentation drawing (P&ID).

17. The method of claim 15, further comprising:

receiving user-input related to the added 3-D element in the displayed augmented scene; and adjusting at least one of a location or orientation of the added 3-D element in the 3-D model in response to the user-input in the displayed augmented scene.

18. The method of claim 15, further comprising:

receiving user-input in the displayed augmented scene indicating one or more additional 3-D elements used with the added 3-D element;

adding the one or more additional 3-D elements to the 3-D model.

19. The method of claim 15, wherein the displaying the added 3-D element further comprises:

displaying a suggestion of at least one of a location of the added 3-D element, an orientation of the added 3-D element or an additional 3-D element to be used with the added 3-D element.

20. The method of claim 15, further comprising:

determining, by a coarse location determination system, an approximate location of the electronic device, and wherein the 3-D model and functional drawing are accessed based on the approximate location of the electronic device.

21. The method of claim 15, wherein the aligning the 3-D model further comprises:

capturing, by a camera of the electronic device, a stream of images of the scene;

matching the stream of images of the scene to the 3-D model to determine a pose of the electronic device, the pose of the electronic device including an orientation and a precise location of the electronic device, wherein the augmenting the scene is based on the pose of the electronic device.

22. The method of claim 15, wherein at least the aligning the 3-D model, displaying the functional drawing, the receiving the user-selection of the one or more lines or symbols, the receiving the user-selection of the modification, the augmenting the scene, and the displaying the added 3-D element in the augmented scene are performed by an augmented reality application executing on the electronic device.

23. The method of claim 15, wherein the electronic device is a head-mounted display unit.

24. A system comprising:

a remote server configured to store a three-dimensional (3-D) model and a functional drawing;

an electronic device including a display, a processor, and a memory configured store instructions for an augmented reality application for execution on the processor, the instructions when executed operable to:

access from the remote server at least a portion of a three-dimensional (3-D) model and a functional drawing for a location of the electronic device, the functional drawing including a plurality of lines and symbols that are independent of size and shape of objects in a physical environment, align the 3-D model with a scene in the physical environment, augment the scene based on the 3-D model, display the augmented scene on the display, receive a user-selection of an object in the physical environment in the displayed augmented scene, determine a 3-D element of the 3-D model that corresponds to the user-selected object, determine a corresponding line or symbol of the functional drawing that corresponds to the 3-D element, and display on the display a version of the functional drawing in which the corresponding line or symbol is highlighted.

25. The system of claim 24, wherein the instructions when executed are further operable to:

display the functional drawing on the display, receive a user-selection of a line or symbol in the functional drawing, determine a 3-D element of the 3-D model that corresponds to the user-selected line or symbol, generate a path in the augmented scene to an object in the physical environment corresponding to the 3-D element or highlight in the augmented scene the object in the physical environment corresponding to the 3-D element, and display the augmented scene including the path or highlighting on the display.

26. The system of claim 24, wherein the instructions when executed are further operable to:

display the functional drawing on the display, receive a user-selection of one or more lines or symbols in the functional drawing, receive a user-selection of a modification to a process flow to the functional drawing involving the one or more user-selected lines or symbols, add a 3-D element to the 3-D model corresponding to the modification, the 3-D element coupled to elements representing the one or more user-selected lines or symbols, display the added 3-D element in the augmented scene on a display of the electronic device, and save an updated version of the 3-D model including the added 3-D element to the remote server.

27. The system of claim 24, wherein the electronic device is a head-mounted display unit.

* * * * *